US012559248B2

(12) United States Patent
Auriol et al.

(10) Patent No.: US 12,559,248 B2
(45) Date of Patent: Feb. 24, 2026

(54) METHOD FOR BRAKING AN AIRCRAFT TURBINE ENGINE

(71) Applicant: SAFRAN AIRCRAFT ENGINES, Paris (FR)

(72) Inventors: Jacques Auriol, Moissy-Cramayel (FR); Pierre-Alain Jean Philippe Reigner, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/730,263

(22) PCT Filed: Jan. 18, 2023

(86) PCT No.: PCT/FR2023/050072
§ 371 (c)(1),
(2) Date: Jul. 18, 2024

(87) PCT Pub. No.: WO2023/148439
PCT Pub. Date: Aug. 10, 2023

(65) Prior Publication Data
US 2025/0101930 A1      Mar. 27, 2025

(30) Foreign Application Priority Data
Feb. 1, 2022     (FR) ...................................... 2200883

(51) Int. Cl.
*B64D 33/00*      (2006.01)
*B60L 7/06*       (2006.01)
(Continued)

(52) U.S. Cl.
CPC ................ *B64D 33/00* (2013.01); *B60L 7/06* (2013.01); *B64D 31/00* (2013.01); *F02K 1/66* (2013.01);
(Continued)

(58) Field of Classification Search
CPC ................................ B64D 31/00; B64D 33/00
See application file for complete search history.

(56) References Cited

U.S. PATENT DOCUMENTS 3,515,968 A  *  6/1970  Crawford .................. B60L 7/06
                                            180/65.245
7,621,117 B2 *  11/2009  Dooley ................... F01D 19/00
                                            60/793
(Continued)

OTHER PUBLICATIONS

International Application No. PCT/FR2023/050072, International Search Report and Written Opinion mailed May 8, 2023, 12 pages (2 pages English translation and 10 pages of original document).

*Primary Examiner* — Jason H Duger
(74) *Attorney, Agent, or Firm* — Kilpatrick Townsend & Stockton LLP

(57) ABSTRACT

Method for braking an aircraft turbine engine including a fan or a propeller connected to a turbine by a shaft and an electric generator connected to the shaft, the method comprising the following steps:
a request to brake the turbine engine by thrust reversal;
a calculation of a turbine braking setpoint by a control system; and
in response to the braking setpoint, an adjustment by the control system of a resistance of a dissipative load to draw electric power from the electric generator to the dissipative load.

12 Claims, 2 Drawing Sheets

(51) Int. Cl.
   *B64D 31/00*     (2024.01)
   *F02K 1/66*      (2006.01)
   *F02K 1/76*      (2006.01)
(52) U.S. Cl.
   CPC ............ *F02K 1/76* (2013.01); *F05D 2260/70*
   (2013.01); *F05D 2260/901* (2013.01)

(56)                References Cited

U.S. PATENT DOCUMENTS

|  |  |  |  |  |
|---|---|---|---|---|
| 7,690,186 B2 * | 4/2010 | Dooley | .................. | F01D 15/10 |
|  |  |  |  | 60/770 |
| 7,906,922 B2 * | 3/2011 | Thunes | .................... | H02P 3/12 |
|  |  |  |  | 318/377 |
| 8,692,489 B2 * | 4/2014 | Maalioune | ............. | F02K 1/763 |
|  |  |  |  | 318/362 |
| 2008/0276620 A1 * | 11/2008 | Ullyott | ................... | F01D 21/06 |
|  |  |  |  | 60/773 |
| 2013/0033204 A1 | 2/2013 | Maalioune |  |  |
| 2014/0021898 A1 * | 1/2014 | Hendrickson | ........ | H02P 29/028 |
|  |  |  |  | 318/434 |
| 2015/0098792 A1 | 4/2015 | Doebbeling et al. |  |  |
| 2018/0229851 A1 * | 8/2018 | Joshi | ..................... | B64D 27/16 |
| 2020/0215922 A1 | 7/2020 | Sawata et al. |  |  |
| 2020/0307774 A1 | 10/2020 | Zingaro et al. |  |  |
| 2021/0135603 A1 * | 5/2021 | Popek | ....................... | H02P 3/14 |
| 2021/0192964 A1 * | 6/2021 | Van Deventer | ........ | B60L 50/60 |
| 2022/0120224 A1 * | 4/2022 | Cormier | .................... | F02C 9/58 |
| 2022/0356849 A1 * | 11/2022 | Gilson | .................. | B64D 31/18 |
| 2022/0363401 A1 * | 11/2022 | Wiegman | .............. | B64D 27/34 |

* cited by examiner

METHOD FOR BRAKING AN AIRCRAFT TURBINE ENGINE

CROSS REFERENCE TO RELATED APPLICATIONS

This application is a U.S. national phase under 35 U.S.C. § 371 of International Patent Application No. PCT/FR2023/ 050072, filed on Jan. 18, 2023, which claims priority to French Patent Application No. 2200883, filed on Feb. 1, 2022, the entire contents of both of which are incorporated herein by reference in their entireties.

TECHNICAL FIELD

The present invention relates, in general terms, to aircraft turbine engines, and in particular to turbine engines equipped with a variable-pitch fan or propeller connected to a turbine by means of a shaft and more precisely, the braking of such turbine engines.

More particularly, the invention relates to a method for braking a turbine engine, including a turbine connected to a variable-pitch fan or propeller by a shaft.

PRIOR ART

Conventionally, the braking of an aircraft by a turbine engine equipped with a variable-pitch fan or propeller is based, at the very least partly, on thrust reversal, also known as "reverse". In particular, the angle of the blades of the fan or of the propeller is modified so that the jet blast created by the rotation of the blades is redirected forwards and con- tributes to braking the aircraft.

The orientation of the blades may be adjusted either by passing through a small pitch area, or a high pitch area.

Passing through small pitches or zero pitches is preferred. Indeed, it generates less torque and does not reverse the profile of the blade in relation to the incident air flow, which improves the braking thrust and reduces the stall of the air flow, which may be problematic for the mechanical and fatigue resistance of the propeller.

However, it leads to an increase in the speed of the propeller and the resulting overspeed is such that it must be taken into account for the sizing of rotating parts.

Resizing results in an increase in the weight of the turbine engine, which is incompatible with the approaches of reduc- ing the weight of the aircraft.

In addition, the increase in speed when the propeller or the fan passes through the small pitch areas leads, on architec- tures with low-pressure compressors connected to the low- pressure shaft, to a compression mismatch between the high-pressure body, which is at idling speed and the com- pressor of the low-pressure body, which on the contrary, is in compression limit due to its high speed and low flow that authorises the core during idling, which makes the turbine engine subject to a so-called hunting or stalling phenomenon resulting in aerodynamic instability of the turbine engine.

A conventional solution for addressing this problem is to resize the low-pressure compressor in order to have an additional compression capacity in these conditions, which impacts the cost and the weight of the aircraft.

DESCRIPTION OF THE INVENTION

Therefore, the aim of the invention is to remedy these drawbacks and propose a method for braking that is suffi- cient and adapted for a turbine engine connected by means of a shaft to a variable-pitch fan or propeller, without it being necessary to resize the turbine engine or increase its weight.

Therefore, a method is proposed for braking an aircraft turbine engine including a fan or a propeller connected to a turbine by a shaft, and an electric generator connected to the shaft, the method comprising the following steps:

a request to brake the turbine engine by thrust reversal;

a calculation of a turbine braking setpoint by a control system; and in response to the braking setpoint, an adjustment by the control system of a resistance of a dissipative load to draw electric power from the electric generator to the dissipative load.

Preferably, the braking method comprises controlling the pitch of the blades of the fan or of the propeller, the step of adjusting the resistance being carried out when the fan or the propeller operates at a windmilling rotational speed.

Advantageously, the braking setpoint may also be a requested torque for the braking from which is subtracted a torque dedicated to electric power consumers of the aircraft.

Preferably, the braking setpoint is calculated as a function of the thermal capacity of the dissipative load.

According to one implementation, the dissipative load can be formed by the electric generator.

According to one feature, the electric generator can be internally short circuited and simultaneously disconnected from the electrical network of the aircraft during the draw- down of electric power for the short duration of the reverse transition.

According to one implementation, the dissipative load can be formed by the resistance of a de-icing system.

According to another implementation, the turbine engine comprises a low-pressure body and a high-pressure body, the turbine connected to the fan or propeller being a turbine of the low-pressure body, the resistance being formed by a high-pressure electric motor controller of the high-pressure body, and the dissipative load being formed by an electric motor of the high-pressure body. This makes it possible to limit the low-pressure speed increase when the propeller or the fan passes through the low-pitch area, while helping the high-pressure speed, in order to make it possible for the core to accelerate to the maximum thrust reversal power after the transition of the pitch.

The invention also relates to an aircraft turbine engine including a fan or a propeller connected to a turbine by a shaft, and an electric generator connected to the shaft, the turbine engine comprising a control system configured to calculate a turbine braking setpoint in response to a request to brake the turbine engine by thrust reversal, and configured to adjust a resistance of a dissipative load in response to the braking setpoint to draw electric power from the electric generator to the dissipative load.

Preferably, the control system is configured to calculate the braking setpoint as a function of the thermal capacity of the dissipative load.

According to one embodiment, the dissipative load can be formed by the electric generator.

The invention further relates to an aircraft comprising at least one turbine engine as previously described.

BRIEF DESCRIPTION OF THE DRAWINGS

Other aims, advantages and features will become apparent from the following description, given purely by way of illustrative example and made with reference to the appended drawings wherein.

Moreover, the expression "at least one" used in the present description is equivalent to the expression "one or more".

DETAILED DESCRIPTION OF ONE EMBODIMENT

Figures 1, 2:
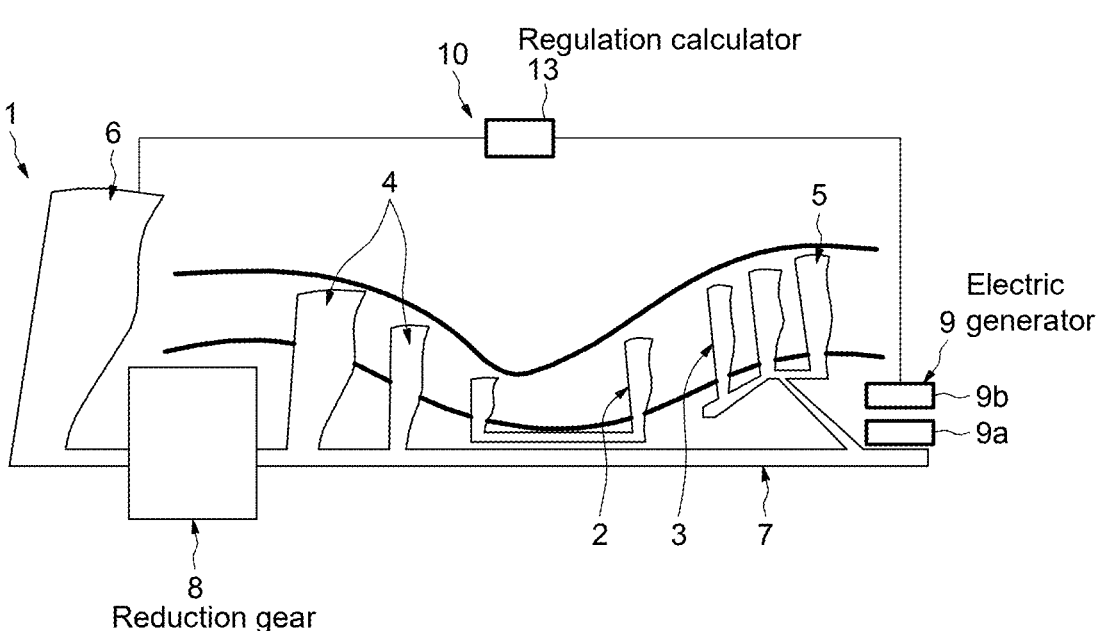
FIG. 1 schematically shows an aircraft turbine engine according to one embodiment of the invention.
FIG. 2 schematically shows the architecture of an electric generator connected to a dissipative load of a turbine engine according to one embodiment of the invention.

FIG. 1 schematically shows an aircraft turbine engine 1.

In the example shown, the turbine engine comprises a high-pressure body 2 including a high-pressure compressor and a high-pressure turbine, and a low-pressure body 3 including a low-pressure compressor 4 and a low-pressure turbine 5.

The low-pressure body 3 is connected to a fan 6 by means of a shaft 7 and a reduction gear 8.

In the example shown, the fan 6 is a variable-pitch fan.

Alternatively, the fan 6 can be replaced by a propeller, for example a variable-pitch propeller.

In addition, an electric generator 9 connected to the shaft 7 is arranged downstream of the low-pressure turbine 5 and includes a rotor 9a and a stator 9b.

The electric generator 9 includes an internal resistance.

It is possible that the electric generator 9 is arranged upstream of the low-pressure turbine 5, for example at the periphery of the fan 6.

The turbine engine 1 comprises a control system 10 configured to calculate a turbine 5 braking setpoint in response to a request to brake the turbine engine 1 by thrust reversal.

The control system 10 is further configured to adjust the resistance 11 of a dissipative load 12 as shown in FIG. 2, in response to the braking setpoint to draw electric power from the electric generator 9 to the dissipative load 12. The resistance 11 is a variable resistance.

In other terms, the control system 10 is capable of adjusting the torque on the shaft 7 of the low-pressure body 3 as a function of the braking setpoint so as to draw and dissipate some of the electric power from the electric generator 9 to the dissipative load 12.

Braking setpoint means a torque drawdown setpoint, in the example shown of the low-pressure turbine 5 on the low-pressure body 5.

In the example shown, the control system 10 includes a regulation calculator 13 configured to calculate the braking setpoint and a torque control calculator 14 configured to adjust the resistance 11 of the dissipative load 12 as a function of the braking setpoint.

The regulation calculator 13 and the torque control calculator 14 are connected by electrical connection. The electrical connection may be analogue or digital.

Preferably, the control system 10 is also configured to calculate the braking setpoint as a function of the thermal capacity of the dissipative load 12

According to another embodiment, the dissipative load 12 is formed by the electric generator 9.

In this case, it is possible that the control system 10 includes a calculator of the electric generator 9 configured to calculate the braking setpoint and adjust the internal short-circuit resistance 11 of the electric generator 9 in response to the braking setpoint.

Preferably, the control system 10, for example the regulation calculator 13, is configured to control the pitch of the fan 6.

The invention also relates to a method for braking the aircraft turbine engine 1 comprising a request to brake, requested for example by the pilot of the aircraft, associated with a requested braking torque 15 for braking the turbine engine 1 by thrust reversal.

In the example shown, the torque considered to limit is the drive torque of the low-pressure body 3 generated on the shaft 7 by the low-pressure turbine 5 and the fan 6.

The braking method further comprises the calculation of a braking setpoint of the low-pressure turbine 5 by the control system 10.

As shown in FIG. 2, in the example shown, the braking setpoint is calculated by the regulation calculator 13 then communicated to the torque control calculator 14.

Preferably, the calculation of the braking setpoint of the low-pressure turbine 5 is only carried out after receiving a braking authorisation.

In response to the braking setpoint, an adjustment by the control system adjusts the resistance 11 of the dissipative load 12 such that some of the electric power of the electric generator 9 is dissipated to the dissipative load 12.

The dissipation of current from the electric generator 9 through the dissipative load 12 results in a limitation of the torque generated by the low-pressure turbine 5 and the fan 6 in order to carry out the braking.

In the example shown, the resistance 11 is adjusted by the torque control calculator 14.

Preferably, the step of adjusting the resistance 11 is carried out when the fan 6 operates at a windmilling rotational speed.

The fan 6 is brought to a windmilling rotational speed by controlling the pitch of its blades.

Windmilling rotational speed means an operation of the fan 6 wherein the torque provided by the fan 6 is zero.

Figure 3:
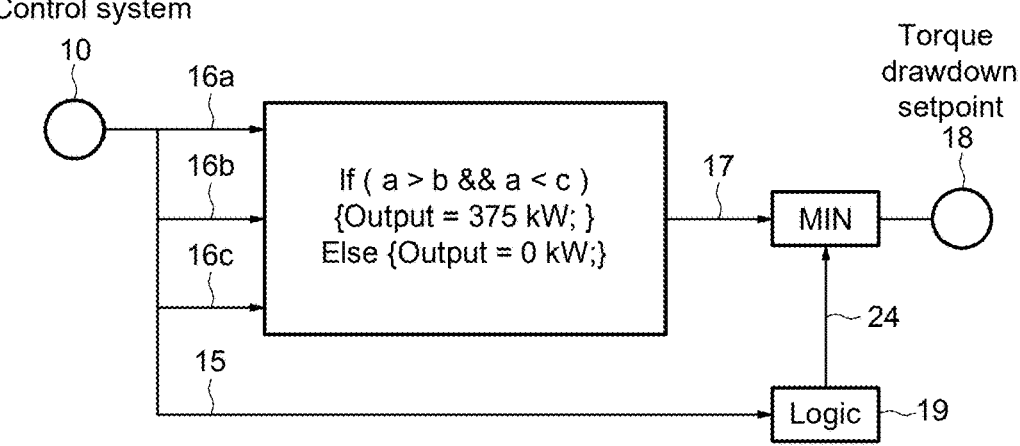
FIG. 3 shows a braking logic according to one embodiment of the invention.

FIG. 3 shows a braking logic intended to limit the torque of the low-pressure turbine 5 by dissipating the current of the electric generator 9 to the dissipative load 12 and, consequently, intended to limit the torque transmitted to the fan 6.

In the example shown, when the fan 6 is at a windmilling rotational speed wherein the acquired pitch 16a of the blades of the fan 6 is located between a low-pitch limit 16b and a high-pitch limit 16c, the regulation calculator 13 of the control system 10 calculates a torque value 17 to be drawn on the low-pressure turbine 5.

The result is a braking setpoint resulting in a torque drawdown setpoint 18 on the electric generator 9.

In the example shown, the control system 10 integrates, in order to respond to the braking setpoint, an on/off control logic.

Figure 4:
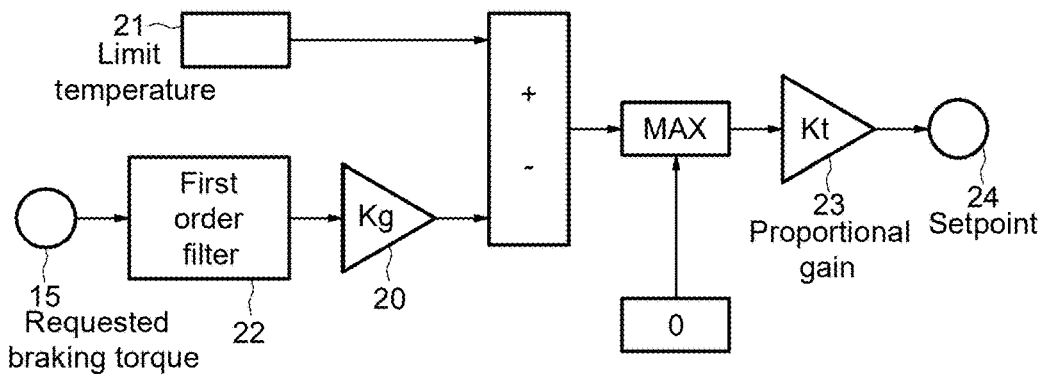
FIG. 4 shows a logic for protecting the dissipative load against overheating according to one embodiment of the invention.

As shown in FIG. 4, the braking method preferably includes, in addition to the braking logic, a logic 19 for protecting the dissipative load 12 against overheating.

In this respect, the braking setpoint can be calculated as a function of the thermal capacity of the dissipative load 12.

The thermal capacity is equal to the difference between an estimated temperature 20 of the dissipative load 12 and a limit temperature 21 of the dissipative load 12.

The limit temperature 21 is a constant representing the temperature limit not to be exceeded, including a safety margin.

The estimated temperature 20 is calculated from the requested torque 15. A first order filter 22 can be used to estimate the coarse mesh thermal, but this modelling can be performed with higher order, tabulated, non-linear models and/or based on other information such as the cooling capacity.

A proportional gain 23 for the logic 19 protecting the dissipative load 12 against overheating leads to a setpoint 24 limiting the torque drawn from the electric generator 9. The torque drawdown setpoint 18 is advantageously calculated as a function of the logic 19 protecting the dissipative load 12 against overheating.

This results in a saturation of the braking setpoint proportional to the thermal capacity.

In the example shown, the logic 19 protecting the dissipative load 12 against overheating does not have a derivative component due to the slow thermal dynamics.

This makes it possible to limit the torque drawn as a function of the thermal limits of the dissipative load 12.

Figure 5:
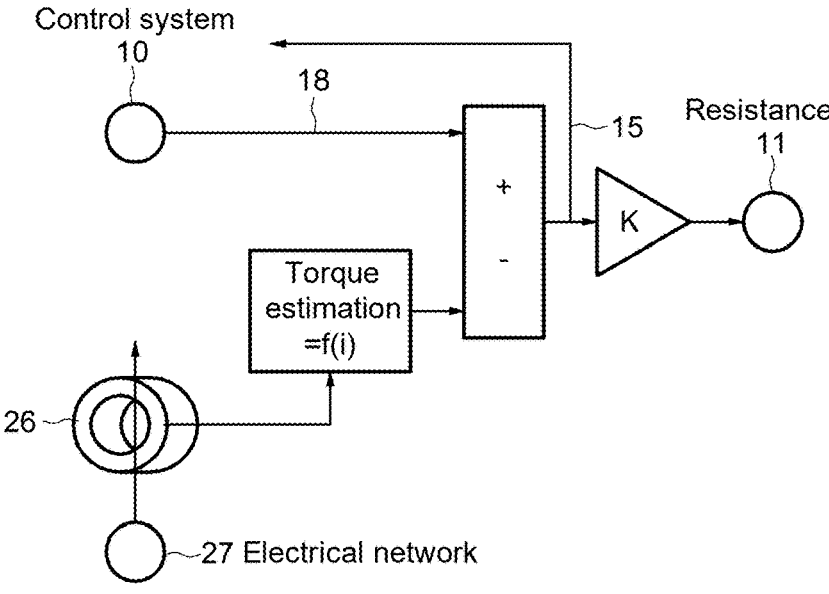
FIG. 5 shows the calculation of a braking setpoint as a function of the torque dedicated to consumers of the electrical network of the aircraft.

With reference to FIG. 5, in the example shown, the braking setpoint is calculated so as to be equal to the requested braking torque 15 from which is subtracted a torque dedicated to electric power consumers of the aircraft.

For example, the torque dedicated to the electric power consumers of the aircraft can be estimated from the measured current value 26 directed to the consumers of the electrical network 27 of the aircraft.

As shown in FIG. 2, it is possible that a rectifier 28 is positioned between the resistance 11 of the dissipative load and the stator 9*b* of the electric generator 9.

According to another embodiment, the dissipative load 12 can be formed by the electric generator 9 if however the electric generator 9 is able to absorb the energy associated with the additional torque drawn on the low-pressure shaft 7 without generating a fire or permanent degradation. The resistance 11 adjusted to respond to the braking setpoint is then in series with the internal resistance of the electric generator 9.

In the case where the dissipative load 12 is formed by the electric generator 9, the electric generator 9 will, preferably, be short circuited, by connecting for example its terminals together by the variable resistance 11, and at the same time disconnected from the electrical network 27 of the aircraft, that is to say open circuited with the electrical network 27. It is thus possible to protect the consumers present in the electrical network 27. The variable resistance 11 makes it possible to adjust the short-circuit current passing through the electric generator 9.

In this respect, the turbine engine 1 may comprise a switching relay capable of isolating the electric generator 9 from the electrical network of the aircraft.

It is also possible that the braking setpoint is calculated and the short-circuit resistance 11 of the electric generator 9 is adjusted by the calculator of the electric generator 9.

The invention claimed is:

1. A braking method for braking an aircraft turbine engine comprising a fan or a propeller connected to a turbine by a shaft and an electric generator connected to the shaft, the method comprising the following steps:

a request to brake the turbine engine by thrust reversal;

a calculation of a turbine braking setpoint by a control system; and in response to the calculation of the turbine braking setpoint, an adjustment by the control system of a resistance of a dissipative load to draw electric power from the electric generator to the dissipative load.

2. The braking method according to claim 1, further comprising controlling a pitch of blades of the fan or of the propeller, wherein the step of adjusting the resistance is carried out when the fan or the propeller operates at a windmilling rotational speed.

3. The braking method according to claim 1, wherein the turbine braking setpoint is equal to a requested torque for the request to brake from which is subtracted a torque dedicated to electric power consumers of an aircraft.

4. The braking method according to claim 1, wherein the turbine braking setpoint is calculated as a function of thermal capacity of the dissipative load.

5. The braking method according to claim 1, wherein the dissipative load is formed by the electric generator.

6. The braking method according to claim 5, wherein the electric generator is internally short circuited and simultaneously disconnected from an electrical network of an aircraft during a drawdown of electric power.

7. The braking method according to claim 1, wherein the resistance of the dissipative load is formed by a resistance of a de-icing system.

8. The braking method according to claim 1, wherein the turbine engine comprises a low-pressure body and a high-pressure body, wherein the turbine connected to the fan or propeller is a turbine of the low-pressure body, wherein the resistance is formed by a high-pressure electric motor controller of the high-pressure body, and wherein the dissipative load is formed by an electric motor of the high-pressure body.

9. An aircraft turbine engine comprising a fan or a propeller connected to a turbine by a shaft, and an electric generator connected to the shaft, wherein the aircraft turbine engine further comprises a control system configured to calculate a turbine braking setpoint in response to a request to brake the turbine engine by thrust reversal, and wherein the control system is further configured to adjust a resistance of a dissipative load in response to the turbine braking setpoint to draw electric power from the electric generator to the dissipative load.

10. The aircraft turbine engine according to claim 9, wherein the control system is configured to calculate the turbine braking setpoint as a function of thermal capacity of the dissipative load.

11. The aircraft turbine engine according to claim 9, wherein the dissipative load is formed by the electric generator.

12. An aircraft comprising at least one aircraft turbine engine according to claim 9.

* * * * *